United States Patent Office 2,693,417
Patented Nov. 2, 1954

2,693,417
METHOD OF PRESERVING FISH SPECIMENS

George Otto Orth, Jr., Seattle, Wash.

No Drawing. Application March 25, 1952,
Serial No. 278,509

11 Claims. (Cl. 99—3)

This invention relates to preserved natural fishing bait and to the preparation and preservation thereof in a form which is stable at normal or room temperatures and which may be kept in solution or in film bags indefinitely, ready for use.

Such bait as herring, minnows, frogs, worms, etc., may, in accordance with this invention, be preserved in a natural state without impairing their lure value and thus eliminating the necessity of using live bait.

Further, in this process, the bait tissue is rendered sufficiently harmless so as not to produce toxic symptoms, thereby reducing the hazardous conditions of the usual formaldehyded products on the market. Although formaldehyde is used in the process of the present invention, it is essentially removed by conversion to hexamethylene tetramine which is known to be of a very low order of toxicity.

In the prior art, the preservation of bait by formaldehyde, sugar, cooking, etc. has always tended to depreciate the color and/or natural brightness of the lure, thus reducing the effectiveness of the bait. In accordance with the present invention the bait retains its natural color, firmness, and full lure effect.

Another advantage of the present invention is the fact that the natural odor of the fish is preserved, as in the case of herring which deteriorates rapidly. In the case of shrimp, which are known to deaminate rapidly and change odor, shrimp preserved by the present invention have substantially the same odor they had in the fresh state.

Formaldehyde is objectionable in preserved bait for at least two reasons. First, formaldehyde tends to leach off on washing through water and is repulsive to fish. Second, formaldehyde treated fish are toxic from the standpoint of free formaldehyde being ingested.

A further advantage of the invention is the specific retention of firmness of the specimen so that it may be fastened to a fishing hook or hooks without being torn off by its movement through the water or by the trolling action of any gear to which it may be attached. This is evidenced by the lifelike appearance and texture of many specimens treated in accordance with this invention when withdrawn from water after unattacked trolling.

These and other objects and advantages of this invention will be apparent from the following description:

The process of treating bait and other tissue with formaldehyde has long been known. I have found, in treating fish and other specimens with formaldehyde while still alive and in the presence of a wetting agent, such as Carbide and Carbons Tergitols, that an internal action takes place that is not obtained when such specimens are treated in the dead state. Dead fish, unless treated with excessive formaldehyde, will bloat at the stomach and internally decompose. The present process, by treating the fish alive, allows a small amount of aldehyde to enter the stomach, and other internal organs, and, in the presence of the wetting agent, penetrates the blood stream. As a result such internal decay is inhibited by killing the enzymes present in these parts. This is particularly true of stomach enzymes which rapidly decompose the stomach walls of dead fish. In this way, a smaller amount of formaldehyde is used in the process.

Sodium chloride, or in the case of salt water fish, sea salt is used to maintain, as nearly as possible, an isotonic solution. This can be varied to increase the penetration by changing the salt concentration.

In the second step of the process of the present invention, a solution of ammonium carbonate is added to the washed fish and the pH is brought up to 8.6 and allowed to drop by standing. This drop is attributed to the reaction of the formaldehyde with the ammonia to form hexamethylene tetramine. Other agents can be added at this stage, such as sodium meta bisulphite, hydrazine, hydrazine derivatives, etc. They react with the formaldehyde, which is loosely combined with the fish protein, to form harmless addition compounds. The fish so preserved will keep several weeks before the final treatment and it is desirable to watch the pH to see that it becomes constant and does not go to the acid side.

In the third step of the process, the fish are removed from the aldehyde ammonia bath, washed and placed in a 35% solution of triethylene glycol or equivalent glycol polymer or any polyhydric alcohol, such as glycerine, etc. The fish should remain for several days in this solution to reach equilibrium before packaging. I have found that it is necessary to have at least a 35% solution of the glycols to prevent mold and decay setting in. In the case of glycerin, the mold sets in even at 45% concentration upon inoculation. In these cases, it was necessary to add such preservatives as the parapasets (methyl or isopropyl esters of hydroxy benzoic acid). At this stage, color stabilizers, and/or other preservatives may be added, such as antioxidants like pyrogallic acid, tertiary butyl catechol and the like. The pH may be adjusted at this point to prevent color changes, without affecting the preserved condition of the specimen. The color of various specimens is subject to change with varying pH.

The following examples will further illustrate the invention and the manner in which it may be carried out:

Example 1

In preserving the salt water types of bait, such as herring, the following procedure is used:

One hundred gallons of live herring are brailed into a solution composed of the following:

200 gallons of sea water containing:
   0.5% formaldehyde
   0.1% Tergitol #7 wetting agent The fish are allowed to die in the solution and are then transferred to another tank containing 200 gallons of either salt water or 40′ Baumé brine and allowed to stand for two days. The second solution should also contain at least 0.5% formaldehyde. After two days, the fish are washed, after draining, and transferred to the following bath:

200 gallons water containing 0.5% ammonium carbonate. The pH is taken after one hour and adjusted to 8.5 and then the pH is checked every twelve hours until it becomes constant. As soon as it becomes constant, the pH is adjusted in the range of about 7.6 to 8.0 and allowed to stand until ready for the final bath which is composed of 200 gallons of solution containing 35% triethylene glycol and the balance water. The fish are allowed to stand in this solution for at least four days. After four days, the fish are removed and packaged in film bags, such as polyethylene, Saran film, Vinylite or the like. The most desirable film is the Saran film as it has the lowest moisture vapor transmission. The preserved fish will remain in this state almost indefinitely at room temperature.

By this procedure, shrimp, herring, pilchard, smelt, candlefish and various other species have successfully been preserved and processed.

Example 2

For fresh water specimens, the same procedure is employed as set forth in Example 1, except that the salt concentration is eliminated in the first step.

Example 3

Same as Example 1, except that glycerin is used in place of triethylene glycol and 0.01% methyl ester of hydroxy benzoic acid is added.

Ethylene glycol, diethylene glycol, tetraethylene gycol, and glycol 200 molecular weight and 300 molecular weight may be substituted for triethylene glycol of Example 1, with equally as good results. Satisfactory results were also obtained with propylene glycol, polypropylene glycol, dipropylene glycol and tripropylene glycol.

Having thus described my invention, I claim:

1. The method of preserving fish specimens for bait comprising immersing the specimens while alive in an aqueous solution of formaldehyde containing a wetting agent, permitting the specimens to remain in the solution for a period sufficient to result in absorption of the formaldehyde to internal organs of the specimens, and removing the formaldehyde from the solution and reacting the formaldehyde in the specimens with an agent which will result in substantially non-toxic reaction products, and then immersing the specimens in a solution of a color stabilizing agent.

2. The method of preserving fish specimens in a substantially non-toxic condition and in a form of substantially natural color and texture, comprising immersing the specimens while alive in an aqueous solution of formaldehyde containing a wetting agent, permitting the specimens to remain in the solution for a period sufficient to result in absorption of the formaldehyde to internal organs of the specimens, removing the specimens from the solution and converting the formaldehyde absorbed by the specimens to hexamethylene tetramine in situ, then immersing the specimens in a solution of a color stabilizer selected from the group consisting of polyhydric alcohols and polyhydric alcohol ethers.

3. The method of preserving salt water fish specimens comprising immersing the specimens while alive in a salt water solution containing formaldehyde and a wetting agent, permitting the specimens to remain in the solution for a period sufficient to result in absorption of the formaldehyde to internal organs of the specimens, then removing the specimens from the solution and placing them in another solution containing an agent which will react with the absorbed formaldehyde to form substantially non-toxic reaction products.

4. The method of preserving fish specimens comprising immersing the specimens while alive in an aqueous solution of formaldehyde and a wetting agent, permitting the specimens to remain in the solution for a period sufficient to result in absorption of the formaldehyde to internal organs of the specimens, removing the specimens from the solution and placing them in an aqueous solution containing ammonium carbonate, and permitting the specimens to remain in the latter solution for a period sufficient to result in the reaction of the ammonium carbonate with the absorbed formaldehyde to form hexamethylene tetramine.

5. The method as defined by claim 4 in which the specimens are subsequently treated with a color stabilizing agent.

6. The method as defined by claim 4 in which the specimens are subsequently treated with an aqueous solution of a member selected from the group consisting of polyhydric alcohols and polyhydric alcohol ethers.

7. The method as defined by claim 4 in which the specimens are subsequently treated with triethylene glycol.

8. The method as defined by claim 4 in which the specimens are subsequently treated with glycerin containing a methyl ester of hydroxy benzoic acid.

9. The method as defined by claim 4 in which the ammonium carbonate solution is maintained at an alkaline pH.

10. The method as defined by claim 4 in which the ammonium carbonate solution is maintained at a pH in the range of about 7.6 to 8.5.

11. The method of preserving fish specimens comprising immersing the specimens while alive in an aqueous solution of about 0.5% formaldehyde and 0.1% of a wetting agent, permitting the specimens to remain in the solution until they are dead, removing the specimens and placing them in a second solution of about 0.5% formaldehyde and permitting them to remain therein for about 2 days, then placing the specimens in an aqueous solution of about 0.5% ammonium carbonate, whereby the ammonium carbonate will react with the formaldehyde to form hexamethylene tetramine and the pH of the latter solution will drop, adjusting the pH of the latter solution periodically to a value of about 8.5 until the pH remains substantially constant, then readjusting the pH to a value in the range of about 7.6 to 8.0, removing the specimens from the latter solution and placing them in an aqueous solution of a member selected from the group consisting polyhydric alcohols and polyhydric alcohol ethers.

References Cited in the file of this patent

UNITED STATES PATENTS

| Number | Name | Date |
|---|---|---|
| 2,582,534 | Doyle et al. | Jan. 15, 1952 |